3,787,353
STABILIZED POLYOXYMETHYLENE COMPOSITIONS

Takami Ishii, Ichihara, Toshio Yoshikawa, Chiba, and Toshihiro Inaike, Kazuhiro Kuroda, Kunio Kido, and Kiyoaki Tokunaga, Ichihara, Japan, assignors to Ube Industries, Ltd., Ube-shi, Yamaguchi-ken, Japan
No Drawing. Filed June 1, 1971, Ser. No. 148,978
Claims priority, application Japan, June 2, 1970, 45/46,926
Int. Cl. C08g 51/58, 51/60
U.S. Cl. 260—45.9 P         18 Claims

ABSTRACT OF THE DISCLOSURE

A stabilized polyoxymethylene composition which comprises polyoxymethylene and 0.01 to 10% by weight to the polyoxymethylene of a compound of the formula, $$R\text{-}(NHCOOH_2X)_n$$

in which
R is a hydrocarbon group of 2 to 20 carbons, or a hydrocarbon group of 2 to 40 carbons containing oxygen or sulfur as an intermediary atom,
X is cyano or carbamoyl group, and
n is an integer of 2 to 6.

---

This invention relates to polyoxymethylene compositions of improved thermal stability and a novel heat stabilizing agent.

It is known that polyoxymethylene by itself exhibits insufficient thermal stability, lacks processibility, and is apt to be depolymerized particularly at the melting point or higher temperatures, to release formaldehyde.

Thus, various attempts have been made to improve thermal stability of polyoxymethylene.

Prior art in this field includes protection of end hydroxyl groups by chemical treatments such as esterification or etherification of said groups, and addition of stabilizers such as polyamide, polyurethane, urea, etc.

We have engaged in extensive research works in search for satisfactory heat stabilizing agents for polyoxymethylene, and discovered that a group of novel compounds of the general formula, $$R\text{-}(NHCOCH_2X)_n \quad (1)$$

in which
R is a hydrocarbon group of 2 to 20 carbons, or a hydrocarbon group of 2 to 40 carbons containing oxygen or sulfur as an intermediary atom,
X is cyano or carbamoyl group, and
n is an integer of 2 to 6, possesses an excellent heat stabilizing effect for polyoxymethylene.

According to the invention, thus stabilized polyoxymethylene compositions which comprise polyoxymethylene, and a compound of the formula, $$R\text{-}(NHCOCH_2X)_n \quad (1)$$

in which
R is a hydrocarbon group of 2 to 20 carbons, or a hydrocarbon group of 2 to 40 carbons containing oxygen or sulfur as an intermediary atom,
X is cyano or carbamoyl group, and
n is an integer of 2 to 6, and of the amount necessary for the intended stabilization, within the range of 0.01–10% by weight to the polyoxymethylene, are provided.

The invention also provides novel compounds of the formula, $$R\text{-}(NHCOCH_2X)_n \quad (1)$$

in which
R is a hydrocarbon group of 2 to 20 carbons, or a hydrocarbon group of 2 to 40 carbons containing oxygen or sulfur as an intermediary atom,
X is cyano or carbamoyl group, and
n is an integer of 2 to 6.

The invention furthermore provides stabilizers for resin, particularly polyoxymethylene, which comprise the compound of the formula, $$R\text{-}(NHCOCH_2X)_n \quad (1)$$

in which
R is a hydrocarbon group of 2 to 20 carbons, or a hydrocarbon group of 2 to 40 carbons containing oxygen or sulfur as an intermediary atom,
X is cyano or carbamoyl group, and
n is an integer of 2 to 6.

In the compounds of the foregoing Formula 1, R may be a hydrocarbon group of 2 to 20 carbons, for example, any of aliphatic hydrocarbon groups of 2 to 12 carbons, alicyclic hydrocarbon groups of 6 to 8 carbons, and aromatic hydrocarbon groups of 6 to 15 carbons. The hydrocarbon groups preferably contain no aliphatic unsaturation. The aromatic hydrocarbon groups may be those of the formula,

in which
$R^1$ is an alkylene group of 1 to 3 carbons,
m is 0 or 1, and
l is an integer of 2 to 6, for example, o-, m, or p-xylylene group; or those of the formula,

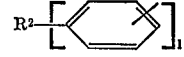

in which $R^2$ is an aliphatic hydrocarbon group of 1 to 3 carbons,
for example, methylene diphenyl group.

Again the group R may be a hydrocarbon group of 2 to 40 carbons containing oxygen or sulfur as an intermediary atom. As such, for example, the groups of the formula, $$-R^3-Y-R^4-$$

in which
each of $R^3$ and $R^4$ is a hydrocarbon group of 1 to 20 carbons, for example, alkylene or phenyl, and
Y is oxygen or sulfur atom, or those of the formula, $$R^5\text{-}(Y\text{-}R^6)_l$$

in which

R⁵ is a hydrocarbon group of 1 to 6 carbons,
R⁶ is a divalent hydrocarbon group of 1 to 6 carbons,
Y is oxygen or sulfur atom, and
$l$ is an integer of 2 to 6.

Among the compounds within the scope of above General Formula 1, suitable specific examples of the formula, $$R\text{-}(NHCOCH_2CN)_n \qquad (1\text{-}a)$$

are as follows:

1,2-bis(cyanoacetamide)ethane,
1,2-bis(cyanoacetamide)propane,
1,3-bis(cyanoacetamide)propane,
1,4-bis(cyanoacetamide)butane,
2,3-bis(cyanoacetamide)butane,
2-methyl-1,2-bis(cyanoacetamide)propane,
1,5-bis(cyanoacetamide)pentane,
1,6-bis(cyanoacetamide)hexane,
1,7-bis(cyanoacetamide)heptane,
1,8-bis(cyanoacetamide)octane,
1,9-bis(cyanoacetamide)nonane,
1,10-bis(cyanoacetamide)decane,
1,12-bis(cyanoacetamide)dodecane,
1,20-bis(cyanoacetamide)eicosane,
1,4-bis(cyanoacetamide)benzene,
1,3-bis(cyanoacetamide)benzene,
1-(cyanoacetamide)-4-(cyanoacetamidemethyl)benzene,
α,α'-bis(cyanoacetamide)-p-xylene,
α,α'-bis(cyanoacetamide)-m-xylene,
2,4-bis(cyanoacetamide)toluene,
1,3-bis(cyanoacetamide)cyclohexane,
1,4-bis(cyanoacetamide)cyclohexane,
1,4-bis(cyanoacetamidemethyl)cyclohexane,
1,3-bis(cyanoacetamidemethyl)cyclohexane,
p,p'-bis(cyanoacetamide)biphenyl,
p,p-bis(cyanoacetamide)diphenylmethane,
p,p'-bis(cyanoacetamide)diphenyl ether,
p,p'-bis(cyanoacetamidemethyl)biphenyl,
γ,γ'-bis(cyanoacetamide)dipropyl ether,
p,p'-bis(cyanoacetamide)diphenyl sulfide,
p,p'-bis(cyanoacetamide)-1,1-diphenyl butane,
1,2,3-tris(cyanoacetamide)propane, and
1,3,5-tris(cyanoacetamide)benzene.

As specific examples of the compounds of Formula 1 in which X is carbamoyl group, i.e., those of the formula $$R\text{-}(NHCOCH_2CONH_2)_n \qquad (1\text{-}b)$$

the following may be named:

1,2-bis(carbamoylacetamide)ethane,
1,2-bis(carbamoylacetamide)propane,
1,3-bis(carbamoylacetamide)propane,
1,4-bis(carbamoylacetamide)butane,
2,3-bis(carbamoylacetamide)butane,
2-methyl-1,2-bis(carbamoylacetamide)propane,
1,5-bis(carbamoylacetamide)pentane,
1,6-bis(carbamoylacetamide)hexane,
1,7-bis(carbamoylacetamide)heptane,
1,8-bis(carbamoylacetamide)octane,
1,9-bis(carbamoylacetamide)nonane,
1,10-bis(carbamoylacetamide)decane,
1,12-bis(carbamoylacetamide)dodecane,
1,20-bis(carbamoylacetamide)eicosane,
1,2-bis[γ-(carbamoylacetamide)propoxy]ethylene,
1,4-bis(carbamoylacetamide)benzene,
1,3-bis(carbamoylacetamide)benzene,
1-(carbamoylacetamide)-4-(carbamoylacetamidemethyl)benzene,
α,α'-bis(carbamoylacetamide)-p-xylene,
α,α'-bis(carbamoylacetamide)-m-xylene,
2,4-bis(carbamoylacetamide)toluene,
1,4-bis(carbamoylacetamide)cyclohexane,
1,3,-bis(carbamoylacetamide)cyclohexane,
1,4-bis(carbamoylacetamidemethyl)cyclohexane,
1,3-bis(carbamoylacetamidemethyl)cyclohexane,
p,p'-bis(carbamoylacetamide)biphenylmethane,
p,p'-bis(carbamoylacetamidemethyl)biphenyl,
p,p'-bis(carbamoylacetamide)diphenyl ether,
γ,γ'-bis(carbamoylacetamide)dipropyl ether,
p,p'-bis(carbamoylacetamide)diphenylsulfide,
p,p'-butylidene-bis[(carbamoylacetamide)benzene],
1,2,3-tris(carbamoylacetamide)propane,
1,3,5-tris(carbamoylacetamide)benzene,
1,3,5-tris(carbamoylacetamidemethyl)benzene,
1,2,3-tris[γ-(carbamoylacetamide)propoxy]propane,
tetraquis[γ-(carbamoylacetamide)propoxymethyl]methane, and
1,2,3,4,5,6-hexaquis[γ-(carbamoylacetamide)propoxy]hexane.

Among the above-specified compounds, those which exhibit particularly excellent stabilizing effect for polyoxymethylene are as follows, as named by the order of their significance:

(i) the compounds in which R is o-, m-, or p-xylene group, e.g., α,α'-bis(carbamoylacetamide)-m-xylene, and α,α'-bis(cyanoacetamide)-m-xylene;
(ii) the compounds in which R is an alkylene group of 2 to 6 carbons, particularly straight chain alkylene group, e.g., 1,6-bis(carbamoylacetamide)hexane; and 1,6-bis(cyanoacetamide)hexane;
(iii) the compounds in which R is a group of the formula, $$-(CH_2)_a-O-(CH_2)_b-$$

wherein $a$ and $b$ are each an integer of 2 to 6), e.g., γ,γ' - bis(carbamoylacetamide)dipropyl ether, and γ,γ'-bis(cyanoacetamide)dipropyl ether.

Generally the cyanoacetamide derivatives of the Formula I exhibit greater stabilizing effect, while the carbamoylacetamide derivatives show less coloring tendency of the polyoxymethylene compositions.

The compounds of the Formula I in accordance with the present invention can be obtained by reacting a polyamine of the general formula, $$R\text{-}(NH_2)_n \qquad (2)$$

in which R and $n$ have the same meanings as defined for the Formula I, with functional derivatives of the compounds of a formula, $$XCH_2COOH \qquad (3)$$

in which X is cyano or carbamoyl group.
for example, lower alkyl (alkyl of no more than 4 carbons) ester, acid halide, or acid anhydride, by the means known per se.

For example, when an ester of the compound of Formula 3 is used as one of the starting materials, the two reactants are reacted temperatures ranging from room temperature to 150° C., preferably in an inert gaseous current, to cause dehydration of the alcohol, whereby a specific compound of the Formula I can be readily obtained.

The compound of Formula I is blended with the resin to be stabilized, particular polyacetal resin, i.e., polyoxymethylene, in an amount of 0.0- to 10% by weight, particularly 0.1 to 5% by weight, to the polymer.

As the polyoxymethylene in the compositions provided by the invention, high molecular weight polymers consisting essentially of oxymethylene recurring structural units are used. As such polymers, besides the homopolymers of, for example, formaldehyde, trioxane or tetroxane with the monomers copolymerizable therewith, for example, cyclic ether, cyclic acetal, ketene, carbon monoxide, styrene, etc., may be named.

These polyoxymethylenes may be used as they are, or after stabilization of their end hydroxyl groups by esterification, etherification, or urethanation by any means known per se. As the polyoxymethylenes, those having an intrinsic viscosity, $[\eta]$, of 0.5–5 are most normally used.

The heat stabilizing agents of the invention exhibit still greater stabilization effect when used concurrently with an antioxidant. While any known antioxidant is useful for this purpose, the following may be named as example:

2,2′-methylene-bis(4-methyl-6-tert.-butylphenol),
2,2′-ethylidene-bis(4-methyl-6-tert.-butylphenol),
2,2′-butylidene-bis(4-methyl-6-tert.-butylphenol),
2,2′-methylenebis(4,6-di-tert.-butylphenol),
2,2′-methylene-bis(4-ethyl-6-tert.-butylphenol),
4,4′-methylene-bis(2,6-di-tert.-butylphenol),
4,4′-butylidene-bis(3-methyl-6-tert.-butylphenol),
4,4′-isopropylidene-bis(2-methyl-6-tert.-butylphenol),
4,4′-thiobis(3-methyl-6-tert.-butylphenol),
2,2′-thiobis(4-methyl-6-tert.-butylphenol),
tetraquis[methylene-3-(3,5-di-tert.-butyl-4-hydroxyphenyl)propionate]methane
1,3,5-trimethyl-2,4,6-tris (3,5-di-tert.-butyl-4-hydroxybenzyl)benzene,
1,1,3-tris(2-methyl-4-hydroxy-5-tert.-butylphenyl)butane,
2,4-bis(4-hydroxy-3,5-di-tert.-butylphenoxy)-6-(n-octylthio)-1,3,5-triazine, and
N,N′-di-β-naphthyl-p-phenylenediamine.

The amount of such antioxidant to be used concurrently with the stabilizer is not critical while normally it ranges from 0.01 to 10% by weight to the polymer.

Blending of the heat stabilizer in accordance with the invention with polyoxymethylene can be effected by optional means. For example, a powdery heat stabilizer of the invention may be directly added and mixed with polyoxymethylene. Or, the stabilizer may be dissolved in a suitable solvent, and the solution may be added to powdery polyoxymethylene. In the latter case, the solvent is removed by evaporation to effect the incorporation of stabilizer to the polyoxymethylene.

The polyoxymethylene compositions of the invention can furthermore comprise other known blending agents such as lubricant, e.g., ethylene distearamide, ethylene dioleylamide, etc.; ultraviolet rays absorbing agent, inorganic filler, pigment, etc., according to accepted practices.

The polyoxymethylene compositions provided by the invention exhibit markedly improved heat stability compared with those incorporated with conventional heat stabilizers which may be expressed by the foregoing Formula 1 but in which $n$ is 1, as clearly demonstrated in the examples and controls hereinafter described. Thus the compositions can form highly stable shaped articles, through injection moulding, extrusion moulding, and the like.

Hereinafter working examples of the invention will be given.

In the following descriptions, $[\eta]$ is the intrinsic viscosity measured with Cannon-Fenske viscometer at 60° C., as to the solution formed by dissolving the particular polyoxymethylene in p-chlorophenol containing 2% of α-pinene, and $A_{222}$ stands for the thermal decomposition rate constant of polyoxymethylene or polyoxymethylene composition in 222° C. air (percentile weight reduction per minute: %/min.), which was determined by placing the powder or chip of polyoxymethylene or polyoxymethylene composition in a test tube of approximately 12 mm. in inner diameter, immersing the test tube in an oil bath of 220° C. for 30 minutes, and dividing the resulting percentile weight reduction in the sample by 30.

Also [2246] stands for 2,2′-methylene-bis(4-methyl-6-tert.-butylphenol).

EXAMPLES 1–10

5.0 grams of polyoxymethylene diacetate having an $[\eta]$ of 1.50, and $A_{222}$ of 0.350 was immersed in 20 ml. of methanol solution containing 1.0% by weight to the polyoxymethylene diacetate of a heat stabilizer, and mixed thoroughly to cause permeation of the latter into the former. The system was vacuum dried at 60° C. to remove the methanol by evaporation, and the resulting dry powder was moulded into pellets of 10 mm. in diameter and 10 mm. in thickness, with a pressing machine. The $A_{222}$ of this pellet was determined.

The above procedures were repeated except that the polyoxymethylene diacetate was added to a methanol solution containing 0.2% by weight to the polyoxymethylene diacetate of "2246" concurrently with the heat stabilizer. The $A_{222}$ of the resulting pellet was also measured.

The results are shown in Table 1 below, in which the $A_{222}$'s of the products incorporated with the heat stabilizer alone are given under column A, and those of the products incorporated with the stabilizer and "2246," under column B.

TABLE 1

| Example number | Heat stabilizer | $A_{222}$ (%/min.) A | $A_{222}$ (%/min.) B |
|---|---|---|---|
| 1 | 1,2-bis(cyanoacetamide)ethane | 0.048 | 0.018 |
| 2 | 1,6-bis(cyanoacetamide)hexane | 0.037 | 0.011 |
| 3 | 1,4-bis(cyanoacetamide)cyclohexane | 0.055 | 0.016 |
| 4 | 1,4-bis(cyanoacetamide)benzene | 0.051 | 0.015 |
| 5 | α,α′-Bis(cyanoacetamide)-m-xylene | 0.055 | 0.015 |
| 6 | p,p′-Bis(cyanoacetamide)diphenylether | 0.050 | 0.015 |
| 7 | p,p′-Bis(cyanoacetamide)diphenyl sulfide | 0.049 | 0.014 |
| 8 | p,p′-Bis(cyanoacetamide)diphenylmethane | 0.052 | 0.015 |
| 9 | γ,γ′-Bis(cyanoacetamide)dipropyl ether | 0.047 | 0.014 |
| 10 | 1,2,3-tris(cyanoacetamide)propane | 0.056 | 0.018 |

CONTROLS 1–6

The procedures of Examples 1 through 10 were repeated, except that the compounds specified in Table 1 as heat stabilizers were replaced by the conventional heat stabilizers, and $A_{222}$'s of the resulting pellets were measured, with the results as shown in Table 2 in which the columns A and B have the same significance as in Table 1.

TABLE 2

| Control number | Heat stabilizer | $A_{222}$ (%/min.) A | $A_{222}$ (%/min.) B |
|---|---|---|---|
| 1 | Cyanoacetamide | 0.088 | 0.065 |
| 2 | N-phenylcyanoacetamide | 0.183 | 0.125 |
| 3 | N-n-butylcyanoacetamide | 0.122 | 0.116 |
| 4 | 1,6-bis(acetylacetamide)hexane | 0.383 | 0.265 |
| 5 | α,α′-Bis(acetylacetamide)-m-xylene | 0.402 | 0.336 |
| 6 | Malonic acid diamide | 0.073 | 0.068 |

EXAMPLES 11–16

To the powdery polyoxymethylene diacetate having an $[\eta]$ of 1.45 and $A_{222}$ of 0.333, specified amounts of a powdery heat stabilizer and "2246" were added and mixed. Each mixture was moulded into chips of 2 mm. in diameter and 2 mm. in length, through an extruder at 190° C., and $A_{222}$ of the chips was measured. The results were as shown in Table 3 below.

TABLE 3

| Example number | Heat stabilizer Compound | (Wt. percent) | "2246" (wt. percent) | $A_{222}$ (%/min.) |
|---|---|---|---|---|
| 11 | 1,6-bis(cyanoacetamide)hexane | 1.0 | | 0.024 |
| 12 | do | 1.0 | 0.2 | 0.008 |
| 13 | do | 0.5 | | 0.045 |
| 14 | do | 0.5 | 0.1 | 0.021 |
| 15 | α,α′-bis(cyanoacetamide)-m-xylene | 1.0 | | 0.028 |
| 16 | do | 1.0 | 0.2 | 0.010 |

In Table 3 above, percentages by weight of the heat stabilizer and "2246" are to the polyoxymethylene diacetate employed.

CONTROLS 7–8

The procedures of Examples 11 through 16 were repeated, except that the compounds of the invention as the heat stabilizer were replaced by cyanoacetamide, and $A_{222}$'s of the resulting pellets were measured.

The results were as shown in Table 4 below, in which the percentages by weight are to the polyoxymethylene diacetate employed.

TABLE 4

| Example number | Heat stabilizer Compound | (Wt. percent) | "2246" (wt. percent) | $A_{222}$ (%/min.) |
|---|---|---|---|---|
| 7 | Cyanoacetamide | 1.0 | | 0.073 |
| 8 | do | 1.0 | 0.2 | 0.058 |

EXAMPLES 17–22

5.0 grams of polyoxymethylene diacetate having an $[\eta]$ of 1.40 and $A_{222}$ of 0.372 was immersed in 20 ml. of a methanol solution containing 1.0 wt. percent to the polyoxymethylene diacetate of the specified heat stabilizer, and thoroughly mixed to be permeated by the latter. Then the methanol was removed as evaporated by vacuum drying, and the remaining dry powder was moulded into pellets of 10 mm. in diameter and 10 mm. in thickness, with a pressing machine. The $A_{222}$ of the pellets was determined.

The above procedures were repeated except that 0.2 wt. percent to the polyoxymethylene diacetate of "2246" was added to the methanol solution of heat stabilizer, and $A_{222}$ of the product pellets was similarly measured.

The results were as shown in Table 5 below, in which the $A_{222}$'s of the pellets incorporated with the heat stabilizer only are given under column A, and those of the pellets incorporated with the heat stabilizer as well as "2246," under column B.

TABLE 5

| Example number | Heat stabilizer | $A_{222}$(%/min.) A | B |
|---|---|---|---|
| 17 | 1,2-bis(carbamoylacetamide)ethane | 0.045 | 0.019 |
| 18 | 1,6-bis(carbamoylacetamide)hexane | 0.043 | 0.018 |
| 19 | $\alpha,\alpha'$-Bis(carbamoylacetamide)-m-xylene | 0.038 | 0.015 |
| 20 | $\gamma,\gamma'$-Bis(carbamoylacetamide)dipropyl ether | 0.040 | 0.016 |
| 21 | 1,2,3-tris(carbamoylacetamide)propane | 0.040 | 0.017 |
| 22 | Tetraquis[$\gamma$-(carbamoylacetamide)propoxymethyl]methane | 0.042 | 0.018 |

CONTROLS 9–10

$A_{222}$'s of the pelletized polyoxymethylene compositions prepared similarly to Example 16 except that the heat stabilizer was replaced by conventional compound, were measured, with the results as shown in Table 6 below, in which the columns A and B have the same significance as in Table 5.

TABLE 6

| Control number | Heat stabilizer | $A_{222}$ (%/min.) A | B |
|---|---|---|---|
| 9 | Cyanoacetic acid amide | 0.095 | 0.068 |
| 10 | Malonic acid diamide | 0.108 | 0.072 |

EXAMPLES 23–28

Polyoxymethylene diacetate having an $[\eta]$ of 1.50 and $A_{222}$ of 0.345 was mixed with 1% by weight thereof of powdery heat stabilizer and moulded into chips of 2 mm. in diameter and 4 mm. in length, with an extruder. The $A_{222}$ of the resulting chips was measured.

The above procedures were repeated except that the polyoxymethylene diacetate was added with 1 wt. percent thereof each of the powdery heat stabilizer and "2246," and $A_{222}$ of the product chips was similarly measured.

The results were as shown in Table 7 below, in which the columns A and B have the same significance as of Table 5.

TABLE 7

| Example number | Heat stabilizer | $A_{222}$ (%/min.) A | B |
|---|---|---|---|
| 23 | 1,2-bis(carbamoylacetamide)ethane | 0.043 | 0.013 |
| 24 | 1,6-bis(carbamoylacetamide)hexane | 0.040 | 0.011 |
| 25 | $\alpha,\alpha'$-Bis(carbamoylacetamide)-m-xylene | 0.035 | 0.009 |
| 26 | $\gamma,\gamma'$-Bis(carbamoylacetamide)dipropyl ether | 0.037 | 0.011 |
| 27 | 1,2,3-tris(carbamoylacetamide)propane | 0.038 | 0.012 |
| 28 | Tetraquis[$\gamma$-(carbamoylacetamide)propoxymethyl]methane | 0.039 | 0.011 |

CONTROLS 11–12

The $A_{222}$'s of pelletized polyoxymethylene compositions obtained through the procedures similar to Example 23, except that the heat stabilizer was replaced by conventional compound, were measured, with the results as shown in Table 8 below. In the same table, the columns A and B have the same significance as of Table 5.

TABLE 8

| Control number | Heat stabilizer | $A_{222}$ (%/min.) A | B |
|---|---|---|---|
| 11 | Cyanoacetic acid amide | 0.090 | 0.065 |
| 12 | Malonic acid diamide | 0.102 | 0.069 |

EXAMPLES 29–34 AND CONTROL 13

The chips prepared similarly to Example 23 were shaped into a disc of 3 mm. in thickness and 30 mm. in diameter, with a hot pressing machine, and its degree of coloring was measured with Hunter's color-difference meter (product of Nippon Denshoku Kogyo Co. Ltd., Model CS-K5). The degree of coloring was expressed by Hunter's whiteness which was calculated as follows:

Hunter's whiteness = $100 - [(100-L)^2 + (a^2+b^2)]^{1/2}$ (in which L stands for lightness, $a$ stands for degree of red-greenness, and $b$, for yellow-blueness).

The results were as shown in Table 9 below, in which the results of the runs using the heat stabilizer only are given under column A of "whiteness," and those of the runs in which both heat stabilizer and "2246" were incorporated, under column B.

TABLE 9

| Example number | Heat stabilizer | Whiteness A | B |
|---|---|---|---|
| 29 | 1,2-bis(carbamoylacetamide)ethane | 89.2 | 90.1 |
| 30 | 1,6-bis(carbamoylacetamide)hexane | 89.4 | 90.4 |
| 31 | $\alpha,\alpha'$-bis(carbamoylacetamide)-m-xylene | 90.5 | 91.0 |
| 32 | $\gamma,\gamma'$-bis(carbamoylacetamide)dipropylether | 89.6 | 90.3 |
| 33 | 1,2,3-tris(carbamoylacetamide)propane | 89.5 | 90.0 |
| 34 | tetraquis[$\gamma$-(carbamoylacetamide)propoxymethyl]methane | 89.2 | 89.7 |
| Control 13 | None | 78.9 | |

CONTROLS 14–15

The whiteness of the shaped product of polyoxymethylene composition prepared as in Example 29, except that the heat stabilizer was replaced by conventionally known compound, was measured, with the result as shown in Table 10. In the same table, the columns A and B have the same significance as of Table 9.

TABLE 10

| Control No. | Heat Stabilizer | Whiteness A | B |
|---|---|---|---|
| 14 | Cyanoacetic acid amide | 70.8 | 72.6 |
| 15 | Malonic acid diamide | 70.4 | 71.3 |

EXAMPLES 35–46

Compositions each composed of polyoxymethylene diacetate having an $[\eta]$ of 1.55 and $A_{222}$ of 0.350 and respectively 1.0 wt. percent and 2 wt. percent thereof of a heat stabilizer and an antioxidant as specified in Table 11 below were prepared through the procedures similar to Example 17, and their $A_{222}$'s were measured.

The results are also given in Table 11.

TABLE 11

| Example No. | Heat stabilizer | Antioxidant | $A_{222}$ (%/min.) |
|---|---|---|---|
| 35 | 1,6-bis(carbamoylacetamide)hexane. | 2246 | 0.012 |
| 36 | $\alpha,\alpha'$-Bis(carbamoylacetamide)-m-xylene. | 2246 | 0.010 |
| 37 | 1,6-bis(carbamoylacetamide)hexane | Tetraquis,methylene-3-(3,5-di-tert. butyl-4-hydroxyphenyl)propionate]methane. | 0.010 |
| 38 | $\alpha,\alpha'$-Bis(carbamoylacetamide)-m-xylene. | ......do...... | 0.009 |
| 39 | 1,6-bis(carbamoylacetamide)hexane. | 1,3,5-trimethyl-2,4,6-tris(3,5-di-tert.butyl-4-hydroxybenzyl)benzene. | 0.011 |
| 40 | $\alpha,\alpha'$-Bis(carbamoylacetamide)-m-xylene. | ......do...... | 0.009 |
| 41 | 1,6-bis(carbamoylacetamide)hexane. | 1,1,3-tris(2-methyl-4-hydroxy-5-tert.-butylphenyl)butane. | 0.009 |
| 42 | $\alpha,\alpha'$-Bis(carbamoylacetamide)-m-xylene. | ......do...... | 0.008 |
| 43 | 1,6-bis(carbamoylacetamide)hexane. | 2,4-bis(4-hydroxy-3,5-di-tert.butylphenoxy)-6-(n-octylthio)-1,3,5-triazine. | 0.013 |
| 44 | $\alpha,\alpha'$-Bis(carbamoylacetamide)-m-xylene. | ......do...... | 0.011 |
| 45 | 1,6-bis(carbamoylacetamide)hexane. | N,N,-di-$\beta$-naphthyl-p-phenylenediamine. | 0.012 |
| 46 | $\alpha,\alpha'$-Bis(carbamoylacetamide)-m-xylene. | ......do...... | 0.010 |

EXAMPLE 47

A copolymer of formaldehyde and ketene having an $[\eta]$ of 1.75 and $A_{222}$ of 0.335 (the monomeric ratio of formaldehyde to ketene being 97 to 3 by weight), 1.0% by weight to the copolymer of $\alpha,\alpha'$-bis(carbamoylacetamide)-m-xylene, and 0.2 by weight to the copolymer of 2246, were mixed, and the resulting polyoxymethylene composition was pelletized similarly to Example 17.

The pellets had an $A_{222}$ of 0.010, and was pure white in color tone.

The polyoxymethylene composition prepared in the similar manner using $\alpha,\alpha'$-bis(cyanoacetamide)-m-xylene instead of $\alpha,\alpha'$-bis-carbamoylacetamide)-m-xylene had an $A_{222}$ of 0.009.

EXAMPLE 48

A polyoxymethylene composition composed of a formaldehyde-carbon monoxide copolymer having an $[\eta]$ of 1.20 and $A_{222}$ of 0.483 (the monomeric ratio of formaldehyde to carbon monoxide being 99 to 1 by weight), 1.0% by weight thereof of $\alpha,\alpha'$-bis(carbamoylacetamide)-m-xylene and also 0.2% by weight of 1,1,3-tris(2-methyl-4-hydroxy-5-tert.-butylphenyl)butane was prepared and pelletized similarly to Example 17.

The pellets had an $A_{222}$ of 0.015, and was pure white in color tone.

The polyoxymethylene composition prepared in the similar manner, using $\alpha,\alpha'$-bis(cyanoacetamide)-m-xylene instead of $\alpha,\alpha'$-bis(carbamoylacetamide)-m-xylene had an $A_{222}$ of 0.013.

EXAMPLE 49

A polyoxymethylene composition composed of a formaldehyde-1,3-dioxolane copolymer having an $[\eta]$ of 1.30 and $A_{222}$ of 0.310 (the monomeric ratio of formaldehyde to 1,3-dioxolane being 98 to 2 by weight) and 1.0% by weight of the copolymer of $\alpha,\alpha'$-bis(carbamoylacetamide)-m-xylene, was prepared and pelletized in the manner similar to Example 17.

The pellets had an $A_{222}$ of 0.017, and was pure white in color tone.

The polyoxymethylene composition prepared in the similar manner using $\alpha,\alpha'$-bis(cyanoacetamide)m-xylene instead of $\alpha,\alpha'$-bis(carbamoylacetamide)-m-xylene had an $A_{222}$ of 0.016.

Separately, another polyoxymethylene composition composed also of the copolymer, 1.0% by weight thereof of $\alpha,\alpha'$-bis(carbamoylacetamide)-m-xylene, and 0.2% by weight to the copolymer of "2246" was pelletized similarly to Example 17, and subjected to the $A_{222}$ measurement.

The pellets had an $A_{222}$ of 0.007, and were pure white in color tone.

The polyoxymethylene composition obtained similarly to the above-mentioned excepting that $\alpha,\alpha'$-bis(cyanoacetamide)-m-xylene was used instead of $\alpha,\alpha'$-bis(carbamoylacetamide)-m-xylene had an $A_{222}$ of 0.007.

Incidentally, novel heat stabilizers employed in the foregoing examples were synthesized as follows, the parts being by weight.

(1) Synthesis of 1,2-bis(cyanoacetamide)ethane 226 parts of ethyl cyanoacetate and 60 parts of ethylenediamine were mixed and allowed to stand at room temperature for 3 hours. Thus formed solid was recrystallized from methanol. The object product had a melting point of 194–195° C.

(2) Synthesis of 1,6-bis(cyanoacetamide)hexane 226 parts of ethyl cyanoacetate and 116 parts of 1,6-hexamethylenediamine were mixed, and allowed to stand for 2 hours at 0° C. The resulting solid was recrystallized from ethanol, to provide the object compound melting at 152–154° C.

(3) Synthesis of 1,4-bis(cyanoacetamide)cyclohexane 226 parts of ethyl cyanoacetate and 114 parts of 1,4-diaminocyclohexane were mixed, and allowed to stand at room temperature for 3 hours. The product was washed with cold methanol, to yield crystalline solid. The infrared absorption spectrum of the product had a conspicuous absorption at 1640 cm.$^{-1}$, indicating the presence of amide linkage.

(4) Synthesis of 1,4-bis(cyanoacetamide)benzene 226 parts of ethyl cyanoacetate and 108 parts of p-phenylenediamine were mixed, and allowed to stand in the atmosphere of nitrogen at 150° C. for 4 hours. After cooling, the product was washed with cold methanol to provide crystalline solid, of which infrared absorption spectrum showed a conspicuous absorption at 1640 cm.$^{-1}$.

(5) Synthesis of $\alpha,\alpha'$-bis(cyanoacetamide)-m-xylene 226 parts of ethyl cyanoacetate was mixed with 136 parts of m-xylylenediamine, and allowed to stand at room temperature for 3 hours. The reaction product was recrystallized from methyl Cellosolve to provide the crystalline product melting at 179–180° C.

(6) Synthesis of p,p'-bis(cyanoacetamide)diphenyl ether 226 parts of ethyl cyanoacetate was mixed with 200 parts of p,p'-diaminodiphenyl ether, and allowed to stand in nitrogen atmosphere at 150° C. for 4 hours. The reaction product was washed with cold methanol. The infrared absorption spectrum of thus obtained crystalline product had a distinct absorption at 1640 cm.$^{-1}$.

(7) Synthesis of p,p'-bis(cyanoacetamide)diphenyl sulfide 226 parts of ethyl cyanoacetate was mixed with 216 parts of p,p'-diaminodiphenyl sulfide, and allowed to stand in nitrogen atmosphere at 150° C. for 4 hours. The product was washed with cold methanol to provide crystalline solid, of which infrared absorption spectrum showed a distinct absorption at 1640 cm.$^{-1}$.

(8) Synthesis of p,p'-bis(cyanoacetamide)diphenylmethane 226 parts of ethyl cyanoacetate was mixed with 198 parts of p,p'-diaminodiphenylmethane, and the mixture was treated similarly to 6 above. Thus obtained object product showed a distinct absorption at 1640 cm.$^{-1}$ in its infrared absorption spectrum.

(9) Synthesis of γ,γ'-bis(cyanoacetamide)dipropyl ether 226 parts of ethyl cyanoacetate was mixed with 132 parts of γ,γ'-diaminodipropyl ether, and the mixture was let stand for 3 hours at normal temperature. The reaction product was recrystallized from ethanol to provide the object product, which had a distinct absorption at 1640 cm.$^{-1}$ in its infrared absorption spectrum.

(10) Synthesis of 1,2,3-tris(cyanoacetamide)propane 339 parts of ethyl cyanoacetate was mixed with 89 parts of 1,2,3-triaminopropane, and the mixture was allowed to stand for 3 hours at normal temperature. Recrystallizing the reaction product from ethanol, the object compound was obtained, which had a distinct absorption at 1640 cm.$^{-1}$ in its infrared absorption spectrum. (Compounds employed in Controls 4 and 5.)

(4) Synthesis of 1,6-bis(acetylacetamide)hexane 260 parts of ethyl acetoacetate was mixed with 116 parts of 1,6-hexamethylenediamine, and the mixture was allowed to stand at normal temperature for 3 hours. The reaction product was recrystallized from n-heptane to provide the object compound, which showed a distinct absorption at 1640 cm.$^{-1}$ in its infrared absorption spectrum.

(5) Synthesis of α,α'-bis(acetylacetamide)-m-xylene 260 parts of ethyl acetoacetate was mixed with 114 parts of m-xylylenediamine, and the mixture was allowed to stand at normal temperature for 3 hours. The product was recrystallized from methanol-water, to provide the object compound, which showed a clear absorption at 1640 cm.$^{-1}$, in its infrared absorption spectrum.

(17) Synthesis of 1,2-bis(carbamoylacetamide)ethane 262 parts of ethyl carbamoylacetate was mixed with 60 parts of ethylenediamine, and the mixture was allowed to stand for a day and night at normal temperature. The reaction product was recrystallized from methanol to provide the object compound, of which infrared absorption spectrum showed no absorption at 1730 cm.$^{-1}$ indicating ester linkage, but had a distinct absorption at 1640 cm.$^{-1}$ indicating the presence of amide linkage.

(18) Synthesis of 1,6-bis(carbamoylacetamide)hexane 262 parts of ethylcarbamoylacetate was mixed with 116 parts of 1,6-hexamethylenediamine, and treated similarly to 17 above. Thus obtained object compound had the melting point at 219–220° C.

(19) Synthesis of α,α'-bis(carbamoylacetamide)-m-xylene 262 parts of ethyl carbamoylacetate and 136 parts of m-xylylenediamine were mixed and treated similarly to 17 above, to provide the object compound melting at 117–118° C.

(20) Synthesis of γ,γ'-bis(carbamoylacetamide)dipropyl ether 262 parts of ethyl carbamoylacetate and 132 parts of γ,γ'-diaminodipropyl ether were mixed and treated similarly to 17 above. A distinct absorption was observed in the product's infrared absorption spectrum at 1640 cm.$^{-1}$, while no absorption was observed at 1730 cm.$^{-1}$.

(21) Synthesis of 1,2,3-tris(carbamoylacetamide)propane 393 parts of ethyl carbamoylacetate and 89 parts of 1,2,3-triaminopropane were mixed and treated similarly to 17 above. A distinct absorption was observed in the product's infrared absorption spectrum at 1640 cm.$^{-1}$, while no absorption was observed at 1730 cm.$^{-1}$.

(22) Synthesis of tetraquis[γ-(carbamoylacetamide)propoxymethyl]methane 524 parts of ethyl carbamoylacetate and 364 parts of tetraquis(γ-aminopropoxymethyl)methane were mixed, and left standing at normal temperature for a day and night. The product was washed with cold methanol to provide the object compound, of which infrared absorption spectrum showed no absorption at 1730 cm.$^{-1}$, but had a distinct absorption at 1640 cm.$^{-1}$.

We claim:

1. A stabilized polyoxymethylene composition comprising a mixture of polyoxymethylene and 0.01 to 10% by weight of the polyoxymethylene of a compound of the formula, $$R(NHCOCH_2X)_n$$

wherein R is selected from the group consisting of
an aliphatic hydrocarbon group of 2 to 20 carbon atoms,
an alicyclic hydrocarbon group of 6 to 8 carbon atoms,
an aromatic hydrocarbon group of 6 to 15 carbon atoms,
a group —R$^3$—Y—R$^4$—, wherein R$^3$ and R$^4$ are alkylene groups of 1 to 20 carbon atoms, or phenylene and Y is an oxygen or sulfur atom; and
a group R$^5$(Y—R$^6$—)$_l$, wherein R$^5$ is an aliphatic hydrocarbon of 1 to 6 carbon atoms, R$^6$ is an alkylene group of 1 to 6 carbon atoms, Y is an oxygen or sulfur atom, and $l$ is an integer of 2 to 6;
X is a cyano or carbamoyl group and n is an integer of 2 to 6.

2. The composition of claim 1, wherein said compound is expressed by the formula, $$R(NHCOCH_2X)_2$$

wherein R is xylylene and X is as defined above

3. The composition of claim 1, wherein said compound is expressed by the formula, $$R(NHCOCH_2X)_2$$

wherein R is a straight chain alkylene group of 2 to 6 carbons, and X is as defined above.

4. The stabilized polyoxymethylene composition of claim 1 which further includes 0.01 to 10% by weight of the polyoxymethylene of an antioxidant for polyoxymethylene.

5. The stabilized polyoxymethylene composition of claim 1 wherein said compound is α,α'-bis(cyanoacetamide)-m-xylene.

6. The stabilized polyoxymethylene composition of claim 1 wherein said compound is α,α'-bis(carbamoylacetamide)-m-xylene.

7. The stabilized polyoxymethylene composition of claim 1 wherein said compound is 1,2-bis(cyanoacetamide) ethane.

8. The stabilized polyoxymethylene composition of claim 1 wherein said compound is 1,6-bis(cyanoacetamide)hexane.

9. The stabilized polyoxymethylene composition of claim 1 wherein said compound is 1,2-bis(carbamoylacetamide)ethane.

10. The stabilized polyoxymethylene composition of claim 1 wherein said compound is 1,6-bis(carbamoylacetamide)hexane.

11. The stabilized polyoxymethylene composition of claim 1 wherein said compound is α,α'-bis(carbamoylacetamide)dipropyl ether.

12. The stabilized polyoxymethylene composition of claim 1 wherein said compound is α,α'-bis(cyanoacetamide)dipropyl ether.

13. The stabilized polyoxymethylene composition of claim 1 wherein said compound is 1,4-bis(cyanoacetamide)cyclohexane.

14. The stabilized polyoxymethylene composition of claim 1 wherein said compound is p,p'-bis(cyanoacetamide)diphenyl ether.

15. The stabilized polyoxymethylene composition of claim 1 wherein said compound is p,p'-bis(cyanoacetamide)diphenyl methane.

16. The stabilized polyoxymethylene composition of claim 1 wherein said compound is 1,2,3-tris(cyanoacetamide)propane.

17. The stabilized polyoxymethylene composition of claim 1 wherein said compound is 1,2,3-tris(carbamoylacetamide)propane.

18. The stabilized polyoxymethylene composition of claim 1 wherein said compound is tetraquis [α-(carbamoylacetamide)propoxymethyl]methane.

References Cited

UNITED STATES PATENTS

| Patent No. | Date | Inventor | Class |
|---|---|---|---|
| 3,131,165 | 4/1964 | Hermann et al. | 260—45.9 |
| 3,235,624 | 2/1966 | Green | 260—857 |
| 3,274,149 | 9/1966 | Berardinelli | 260—45.8 |
| 3,300,441 | 1/1967 | Schmidt et al. | 260—45.8 |
| 2,897,178 | 7/1959 | Hill | 260—45.9 |
| 2,936,298 | 5/1960 | Hudgin et al. | 260—45.9 |
| 3,428,608 | 2/1969 | Hofton et al. | 260—67.5 |
| 3,522,205 | 7/1970 | Gobran et al. | 260—45.9 |

OTHER REFERENCES

Roberts et al., "Basic Principles of Organic Chemistry," 1965, p. 681, section 19–9.

DONALD E. CZAJA, Primary Examiner

R. A. WHITE, Assistant Examiner

U.S. Cl. X.R.

260—45.8 N, 45.95, 67 FP